United States Patent [19]
Duck et al.

[11] Patent Number: 5,615,289
[45] Date of Patent: Mar. 25, 1997

[54] BANDPASS OPTICAL FILTER

[75] Inventors: Gary S. Duck, Nepean; David H. Cushing, Greely; Stephen J. Mihailov, Ottawa, all of Canada

[73] Assignee: JDS Fitel Inc., Nepean, Canada

[21] Appl. No.: 568,650

[22] Filed: Dec. 7, 1995

[51] Int. Cl.⁶ ............................................. G02B 6/28
[52] U.S. Cl. .................. 385/24; 359/589; 385/27; 385/37
[58] Field of Search ................... 385/10, 15, 24, 385/27, 31, 37, 39, 123, 124; 359/586–589; 372/6, 98, 99, 108

[56] References Cited

U.S. PATENT DOCUMENTS 5,249,195  9/1993  Feldman et al. .............. 372/99 X
5,502,782  3/1996  Smith .............................. 385/10 X

*Primary Examiner*—John D. Lee
*Attorney, Agent, or Firm*—Neil Teitelbaum & Associates

[57] ABSTRACT

A bandpass optical filter is provided that is formed within an optical fiber in the form of a Bragg grating. The grating includes multiple Fabry Pérot cavities disposed along the waveguide. Each of the cavities includes a pair of reflectors. Each reflector comprises alternating high-low index regions within the waveguide, each region having a thickness of one quarter-wave at a bandpass wavelength, each alternate region being of a different index of refraction than an adjacent region. A multiple odd quarter-wave or quarter-wave high or low index region is sandwiched between each pair of reflectors. The number of high/low regions within a reflector is selected in accordance with the refractive index difference between two alternate adjacent regions.

9 Claims, 4 Drawing Sheets

BANDPASS OPTICAL FILTER

FIELD OF THE INVENTION

This invention relates generally to optical filters, and more specifically to providing a bandpass filter within an optical waveguide.

BACKGROUND OF THE INVENTION

Certain optical fiber waveguides exhibit the property of photosensitivity that provides a practical means for photo-inducing permanent refractive index changes in the core of those fibers. Photosensitivity is not restricted to fiber structures; it has been detected in several types of planar glass structures, including, for example silca-on-silicon and ion-implanted silca waveguide devices.

The fabrication of optical waveguide devices such as intra-mode retro-reflecting Bragg gratings, mode converter gratings, and rocking rotators have been achieved. The general approach for making these devices is to photoinduce a refractive index grating in the photosensitive core of the optical waveguide. The grating consists of a periodic modulation of the core refractive index along the length of the waveguide. This and other relevant background description relating to methods of photoinducing gratings in photosensitive optical fiber waveguides is well described in U.S. Pat. No. 5,367,588 in the name of Hill et at. issued Nov. 22, 1994. A general overview of photosensitive optical fibers is found in a paper by Raman Kashyap entitled "Photosensitive Optical Fibers: Devices and Applications" published in Optical Fiber Technology 1,17–34 (1994).

Bandpass filters have been fabricated in optical fibers in the form of stepped chirped Bragg gratings. Although these gratings produce bandpass filtering, they are limited in their response and in some instances not suitable.

However, it is believed that as optical fiber grating technology improves, for example to a state where greater refractive index differences are achievable between high low pairs, that more practicable results will be attainable utilizing the basic teachings of this invention. It is further believed, that less ripple and steeper slopes will be attainable utilizing the teachings of this invention.

In view of the limitations of the prior art, it is an object of this invention to provide a bandpass filter that overcomes many of these limitations.

Furthermore, it is an object of this invention to provide a bandpass filter in the form of a Bragg grating multi-Fabry Pérôt structure that reduces transmission ripple in the passband normally associated with other bandpass filters.

In accordance with the invention, a bandpass filter is provided that comprises an optical waveguide having at least a Bragg grating therein, the at least Bragg grating defining a plurality of Fabry Pérôt cavities disposed along the waveguide, a first cavity including two reflectors, each reflector comprising "v" alternating high-low (or low-high) index regions within the waveguide, each high or low index region having a thickness of one quarter-wave at a bandpass wavelength, each alternate region being of a different index of refraction than an adjacent region, and a multiple quarter-wave high or low index region sandwiched between the two reflectors, and, a second Fabry Pérôt cavity including two reflectors, each reflector comprising "u" alternating high-low (or low-high) index regions within the waveguide, each region having a thickness of one quarter-wave at a bandpass wavelength, each alternate region being of a different index of refraction than an adjacent region, and a multiple quarter-wave high or low index region sandwiched between the two reflectors, the values of "u" and "v", may be different and selected in accordance with the refractive index difference between two alternate adjacent regions.

In accordance with the invention, there is provided, a bandpass filter comprising: an optical fiber having Bragg grating, the Bragg grating defining multiple Fabry Pérôt cavities disposed along the fiber, each cavity comprising a quarter-wave or multiple odd-quarter-wave, at a bandpass wavelength, high or low refractive index a spacer region sandwiched between two reflectors, each reflector comprising a plurality of quarter-wave high/low (or low/high) index periodically alternating regions.

BRIEF DESCRIPTION OF THE DRAWINGS

Exemplary embodiments of the invention will now be described in conjunction with the drawings in which.

DETAILED DESCRIPTION

Figure 1:
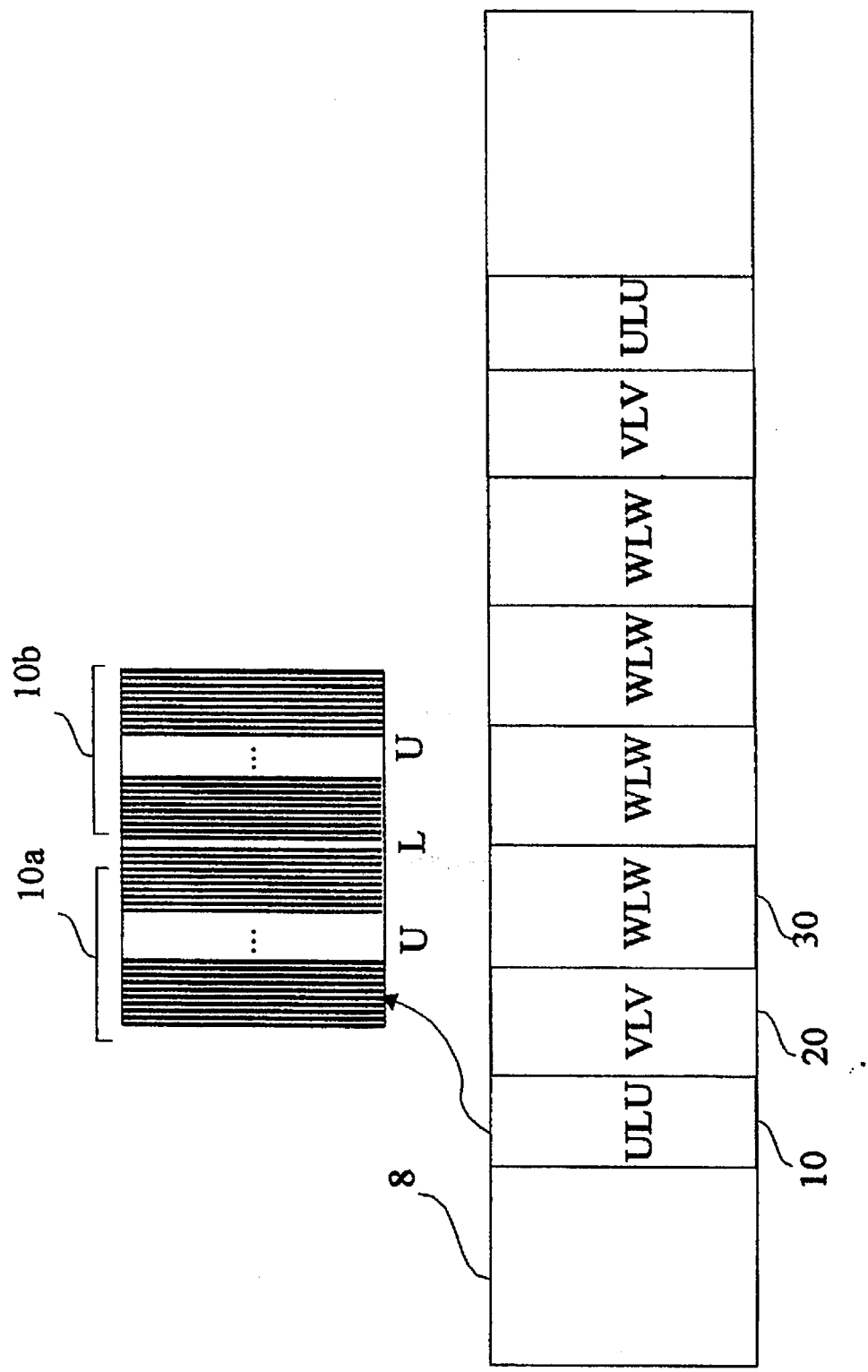
FIG. 1 is an illustration of an optical fiber Bragg grating structure in accordance with this invention.

Turning now to FIG. 1, an optical fiber is shown having photoinduced permanent refractive index changes within the core 8 of the optical fiber defining a basic Bragg grating bandpass filter therein. The filter is comprised of multiple Fabry Pérôt cavities adjacent to one another, however, these cavities may be spaced apart. In this embodiment, the basic filter structure is as follows: 1U 1L 1U 1V 1L 1V (1W 1L 1W) 4 1V 1L 1V 1U 1L 1U, where U, V, and W=570, 730, and 800 high/low index region pairs respectively, and L=one quarter-wave or multiple odd-quarter-wave (at a bandpass wavelength) high or low index region defining a cavity between reflector stacks U, V, and W. The cavity is actually a half-wave of high or low index material, since a quarter wave high or low index region combines with one of the quarter wave regions adjacent to it to provide a half wave cavity.

A first cavity 10 includes a high (n=1.461) or low (n=1.460) refractive index quarter-wave central region sandwiched between two reflectors 10a and 10b. Each reflector is comprised of "U" high/low (index) pairs, each high or low region being one quarter-wave (at a bandpass wavelength) thick, where "U" in this embodiment is selected to be 570 high/low index pairs. Thus, the first Fabry Pérôt cavity has 2280 alternating quarter-wave regions with the central region having an extra quarter-wave or odd multiple thereof.

A second cavity 20 adjacent the first cavity 10, similarly comprises a high or low index quarter-wave central region sandwiched between two reflectors. Each reflector "V" is comprised of "V" high/low (index) pairs, each high or low region being one quarter-wave thick, where "V" in this embodiment is selected to be 730. Thus, the second Fabry Pérôt cavity has 2920 alternating quarter-wave regions. An optional spacer layer an odd number of quarter-waves thick may be present between any of the Fabry Pérot cavities.

A third cavity 30 is disposed adjacent the second Fabry Pérot cavity comprises a quarter-wave or multiple odd-quarter-wave region disposed between reflectors "W". Each reflector is comprised of 800 high/low index pairs. In this design, the third cavity 1W L 1W is repeated 4 times (1W 1L 1W) 4 within the optical fiber so that the 4th, 5th and 6th cavities are identical, providing 12800 high/low index pairs. The entire filter is symmetrical; a seventh cavity is comprised, of 1V 1L 1 V, identical to the second cavity 20, and an eighth last cavity is comprised of 1U 1L 1U identical to the first cavity 10.

Figure 2:
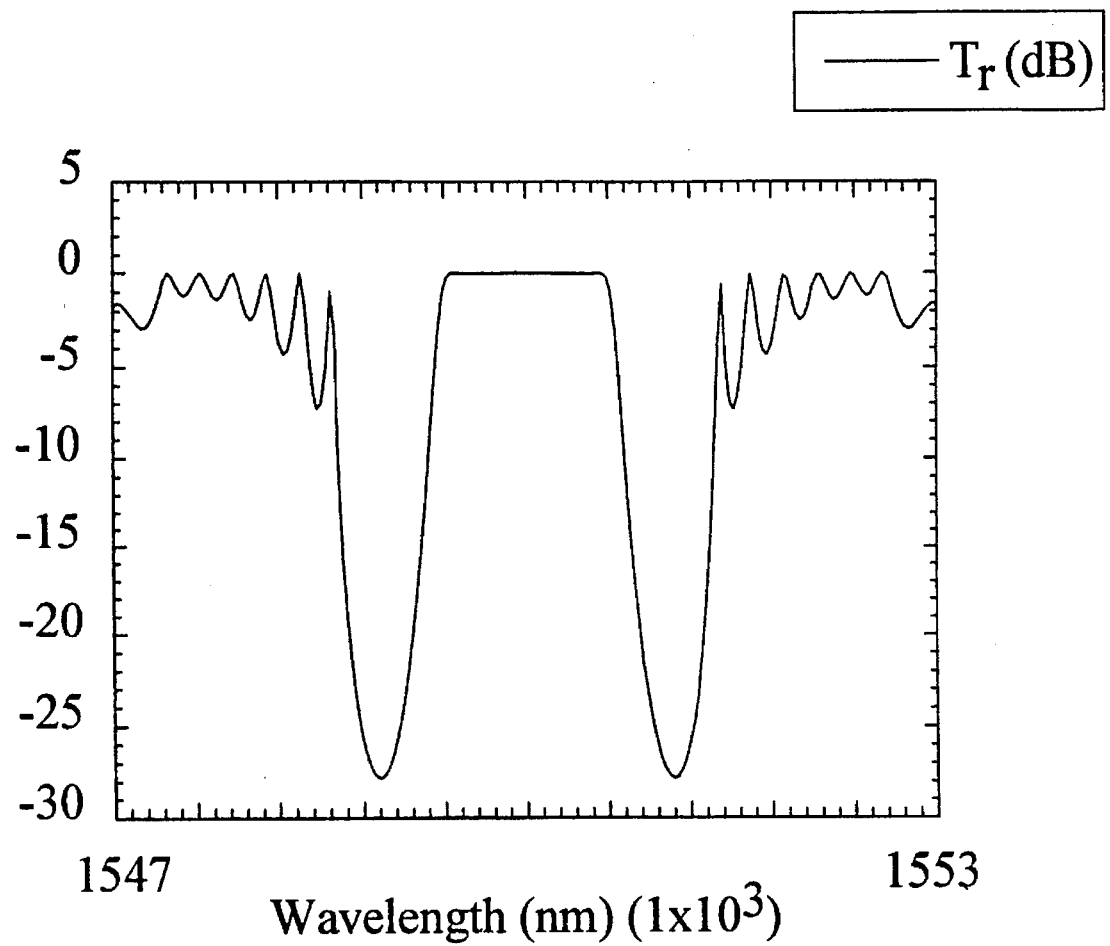
FIG. 2 is a graph of the output response of an optical fiber Bragg grating filter depicting transmission versus wavelength.

Turning now to FIG. 2, the graph indicates an essentially ideal bandpass for a narrow bandpass region. The bandpass region is approximately 1.4 nm wide at 3 dB. Currently, since the refractive index difference is so small, $\Delta n=0.001$, large numbers of high/low regions of index transition are required. However as this technology advances, and the value of $\Delta n$ increases, the values selected for U, V, and W, will decrease, allowing the overall length of these filters will become shorter.

Figure 3:
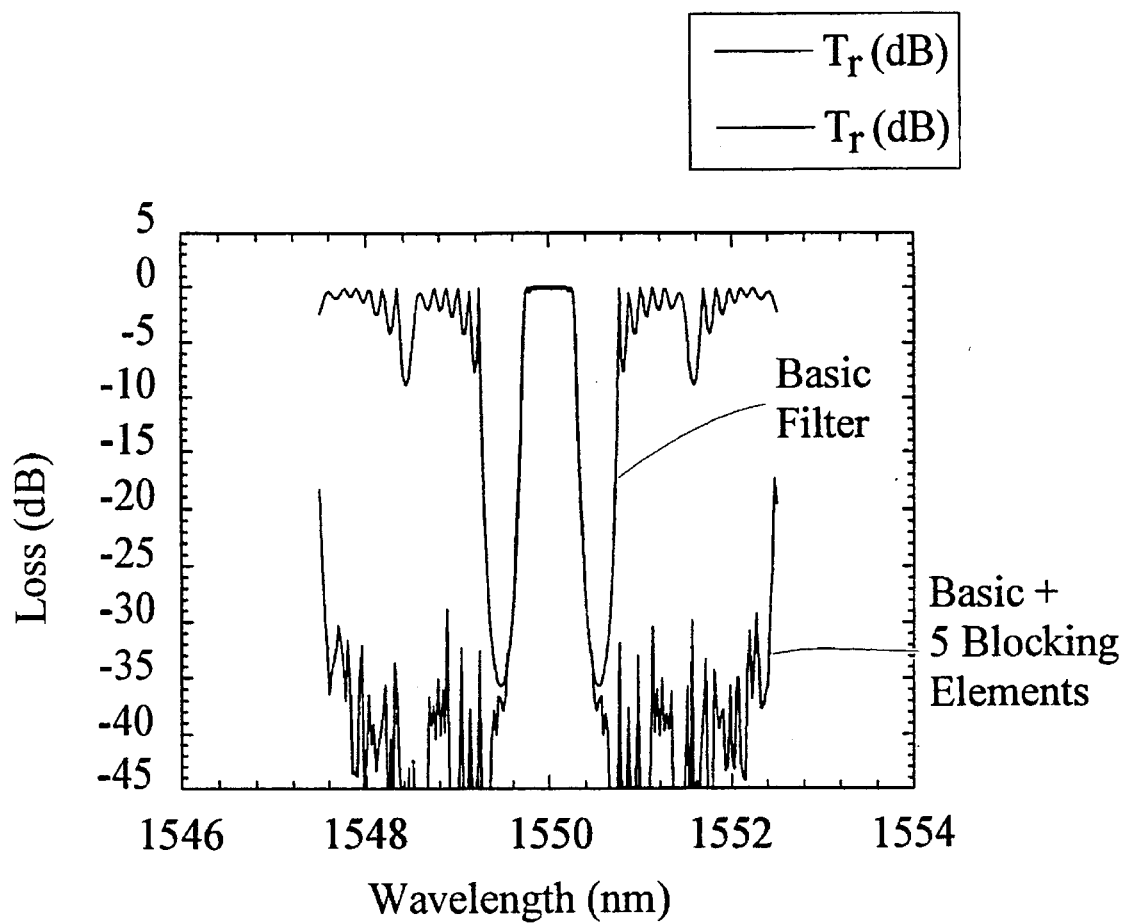
FIG. 3 is a graph of the output response of the optical filter of FIG. 2 including additional blocking elements.

Referring now to FIG. 3, an alternate Bragg optical fiber grating output response is shown that includes five additional blocking elements; the grating has the following structure: 1U 1L 1U IV 1L 1V (1W 1L 1W) 4 1V 1L 1V 1U 1L 1U (1X 1L 1X) 13 (1Y 1L 1Y)17 (1Z 1L 1Z) 24 (1T 1L 1T) 29 (1S 1L 1S)30, where U=570, V=730, W=800, X=450, Y=320, Z=250, T=200 AND S=167 high/low index region pairs and L=one quarter-wave or multiple odd-quarter-wave high, or low index region defining a cavity between a given pair of reflector stacks.

Figure 4:
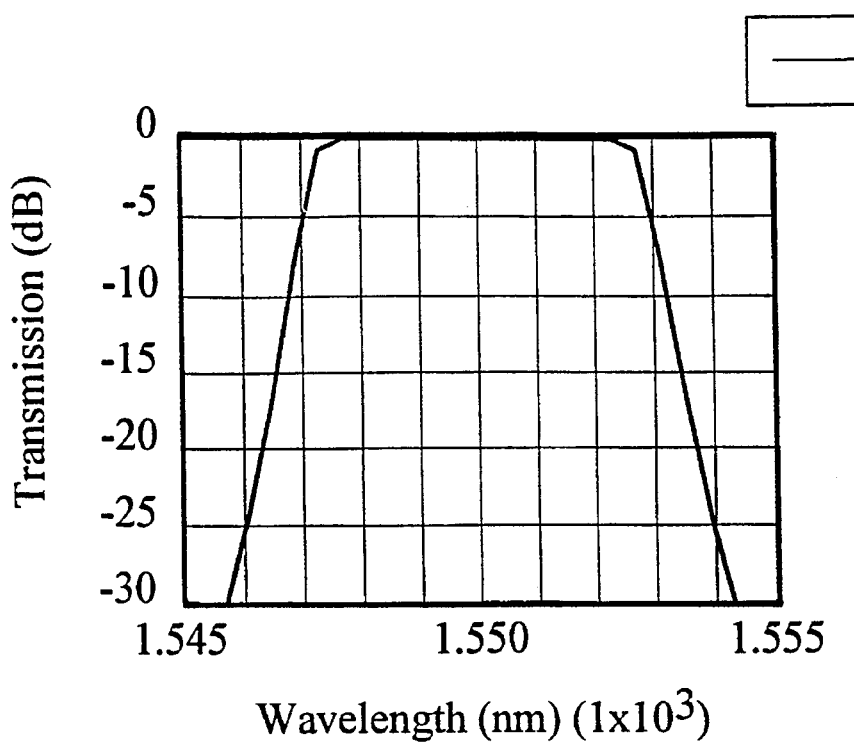
FIG. 4 is a an output response for a filter in accordance with another embodiment of the invention; and, FIG. 5 is an output response depicting the blocking of the filter described in conjunction with FIG. 4.

Referring now to FIG. 4, an output response for a 1 nm wide bandpass filter having 7 cavities with unequal length reflectors is shown. The outer reflectors consist of 285 interference fringes followed by one half wave of fiber (or a half wave of fringe) and followed further by 285 more fringes. All the other cavities are similarly formed. The next inner cavities use 362 fringes for reflectors. A central section has 400 fringes to form reflectors for the main filter. This section may be repeated to produce the depth of blocking and slope required for the final filter. By itself, there would be practically no blocking after one nanometer on each side of the passband.

Figure 5:
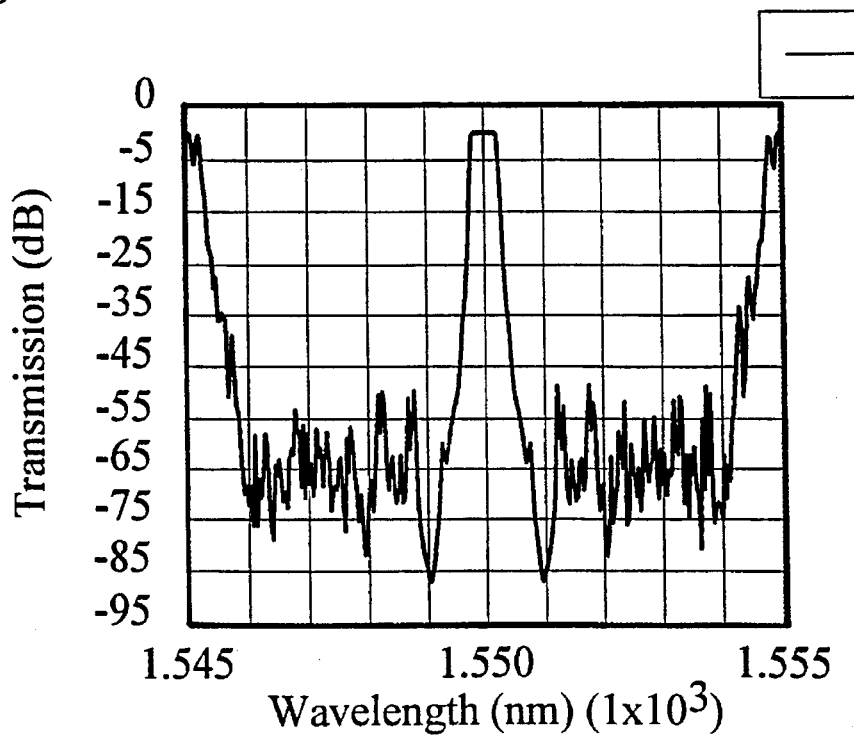

A blocking filter is formed at the same time as the main filter. The blocking (response) region is shown if FIG. 5. It has the same type of reflectors as the main filter but is constructed with fewer fringes in the cavities and more cavities. The results reported are for an index of fiber of 1.4600 and an index of 1.4630 sinusoidally varied to produce the fringes. To achieve a minimum level of 40 dB blocking over a reasonable wavelength range requires the following:

11 cavities at 220 fringes per reflector
14 cavities at 170 fringes per reflector
17 cavities at 142 fringes per reflector
20 cavities at 120 fringes per reflector
24 cavities at 104 fringes per reflector
28 cavities at 91 fringes per reflector
The 3 dB bandwidth is 1 nm.
The 30 dB bandwidth is 1.8 nm.

Preferred Design Techniques

A) Bandpass

1. The cavity design in the most basic form is $(HL)^u$ L $(HL)^u$ where H and L represent quarter wave fringes (with a sinusoidal change from one to the other ), and wherein u represents a number that is a multiplier. The number of pairs of high/low index changes or fringes produces a reflective grating that will yield a specific bandwidth filter for a given index ratio. It will also have a specific reflection value for each cavity length. The cavity structure is repeated to produce the desired level of out of band blocking. Plots of bandwidth versus pairs of fringes will give a table for selection of the basic form.

B) Smoothing

1. Select a three cavity (or more) design as a main bandpass. Add a cavity with 70% of the number of fringes to each side of the main bandpass and calculate the spectral response in the bandpass region. This is the first approximation.

2. Modify the number of fringes in these outer cavities by small increments to establish the widest bandwidth at 90% transmission. This will be the optimum number of fringes.

3. If there is some remaining tipple in the bandpass zone, add another cavity to each side of the main bandpass between the outer cavities. Use 90% of the number of fringes to form the reflectors. Examine the spectral characteristics and modify as in step 2 to produce low ripple. With this cavity length design, test the outer cavities again to yield the optimum design.

4. The number of cavities may be reduced (or increased) for the best design for an application with little or no effect on the ripple.

C) Blocker

1. The blocker consists of a series of multi cavity broadband filters with less pairs of fringes in each cavity. The number of cavities will become large for wavelengths further removed from the design wavelength. The total number of fringes will also increase dramatically as the width of the blocking zone is increased.

2. To achieve a level of blocking, a multiplier factor of the number of pairs of fringes times the number of cavities will be a constant for a given index ratio. The distance between the peak reflection zones is a function of the number of fringes in the reflectors. It is not a linear function. To deduce the correct distance between basic cavities, use the plot of Peak % R vs. Wavelength developed above to select the number of fringe pairs for a linear increment of wavelength. Construct a filter with a sufficient number of cavities to yield blocking. Add enough basic filters to satisfy the wavelength blocking requirement. The increments between basic filters will be small for small changes in index between fringes.

Of course, numerous other embodiments may be envisaged without departing from the spirit and scope of this invention.

Furthermore, increased blocking may be achieved by combining the multiple Fabry Pérot cavity structure of this device, with known prior art Bragg chirped gratings.

Of course the filter described heretofore is not limited to a optical fiber waveguide, but can also be implemented within planar and other waveguide structures.

What is claimed is:

1. A bandpass filter comprising:
    an optical waveguide having at least a Bragg grating therein, the at least Bragg grating defining a plurality of Fabry Pérôt cavities disposed along the waveguide, the cavities including;

a first cavity including two reflectors, each reflector comprising "v" alternating high-low index regions within the waveguide, each region having a thickness of one quarter-wave at a bandpass wavelength, each alternate region being of a different index of refraction than an adjacent region, and a multiple odd-quarter-wave or quarter-wave high or low index region sandwiched between the two reflectors; and, a second Fabry Pérôt cavity including two reflectors, each reflector comprising "u" alternating high-low index regions within the waveguide, each region having a thickness of one quarter-wave at a bandpass wavelength, each alternate region being of a different index of refraction than an adjacent region, and a multiple odd quarter-wave or quarter-wave high or low index region sandwiched between the two reflectors, "v" and "u", being selected in accordance with the refractive index difference between two alternate adjacent regions.

2. A bandpass filter as defined in claim 1, wherein the optical waveguide comprises an optical fiber.

3. A bandpass filter as defined in claim 2, wherein the first cavity is directly adjacent to the second cavity.

4. A bandpass filter as defined in claim 2, wherein the first Fabry Pérôt cavity is spaced an odd number of quarter waves from the second Fabry Pérôt cavity.

5. A bandpass filter as defined in claim 1, wherein "u" and "v" are selected such that they are different values.

6. A bandpass filter comprising:

an optical fiber having Bragg grating, the Bragg grating defining multiple Fabry Pérôt cavities disposed along the fiber, each cavity comprising a multiple odd-quarter-wave or quarter wave high or low refractive index spacer region sandwiched between two reflectors, each reflector comprising a plurality of quarter-wave high/low index periodically alternating regions.

7. A bandpass filter as defined in claim 6, wherein each of the multiple Fabry Pérôt cavities is of the form $(HL)^u L (HL)^u$ where H and L represent quarter wave fringes, and wherein u represents a multiplier, and wherein the filter is comprised of at least three cavities.

8. A bandpass filter as defined in claim 7, further comprising additional cavities on either side of the at least three cavities, for smoothing and reducing ripple associated with the output response, each of the additional cavities having fewer quarter wave fringes than each of the at least three cavities.

9. A bandpass filter as defined in claim 8, further comprising a series of multi-cavities for effecting blocking of predetermined wavelengths.

* * * * *